(12) United States Patent
Derscheid et al.

(10) Patent No.: US 7,472,649 B1
(45) Date of Patent: Jan. 6, 2009

(54) SEQUENCE AND TIMING CONTROL FOR LARGE ROUND BALER EJECTION DEVICE

(75) Inventors: Daniel Eric Derscheid, Hedrick, IA (US); Henry Dennis Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/863,338

(22) Filed: Sep. 28, 2007

(51) Int. Cl.
*B30B 5/06* (2006.01)
*B30B 15/32* (2006.01)

(52) U.S. Cl. .............................. 100/88; 100/7; 100/87; 56/341

(58) Field of Classification Search ................ 100/7, 100/87, 88, 89, 100; 56/341, 344
See application file for complete search history.

(56) References Cited

U.S. PATENT DOCUMENTS

| | | | |
|---|---|---|---|
| 4,483,247 A | * | 11/1984 | Coeffic ........................ 100/88 |
| 5,263,410 A | * | 11/1993 | Olin ............................. 100/88 |
| 6,807,901 B2 | | 10/2004 | Bentzinger et al. |
| 6,892,632 B1 | | 5/2005 | Viesselmann et al. |
| 2004/0020376 A1 | | 2/2004 | Bentzinger et al. |
| 2005/0257513 A1 | | 11/2005 | Smith et al. |

* cited by examiner

*Primary Examiner*—Jimmy T Ngyuen

(57) ABSTRACT

A large round baler is equipped with an ejection ramp which operates such that it moves from a raised home position to a lowered ejection position, only after the discharge gate has moved to a raised discharge position, and moves back to a home position prior to the gate moving back to its lowered baling position. A hydraulic system for actuating a pair of gate cylinders and a single ramp cylinder incorporates a pair of relief valves located between a selective control valve and first chambers of gate and ramp cylinders so as to cause the correct sequence and timing of the movements of the discharge gate and the ejection ramp.

10 Claims, 5 Drawing Sheets

SEQUENCE AND TIMING CONTROL FOR LARGE ROUND BALER EJECTION DEVICE

FIELD OF THE INVENTION

The present invention relates to round bale ejection control, and more specifically relates to a control for the operating sequence and timing of a round baler ejection device so that ejected round bales are held away from the path of movement of the ejection gate.

BACKGROUND OF THE INVENTION

Typical ejection ramps are provided on a round baler so that bales roll down the ramp and away from the baler, but do not operate so as to offer a positive holdback of such bales to keep them from rolling back into the gate.

More recent and complex ramps include extensions on the ramp device that return to the home position to prop the bale away from the baler gate. These devices are represented by those disclosed in U.S. Pat. No. 6,807,901; U.S. Pat. No. 6,892,632; US 20040020376 and US 20050257513. However, these are only effective if the ramp returns to home prior to the discharge gate closing, or if the ramp is powerful enough to move the bale away if the bale is not clearing the baler gate.

While the device disclosed in the aforementioned U.S. Pat. No. 6,807,901 includes a mechanical/hydraulic plunger valve to sense that the ramp is in the home position before closing the gate, this structure is costly and unreliable due to the dirty environment in which it operates, as well as creating additional mechanical mating parts on the ramp.

Therefore, the problem to be solved is to provide an effective, reliable, relatively inexpensive device for timing the operation of an ejection device so as to keep a discharged bale away from the discharge gate until the latter is closed.

SUMMARY OF THE INVENTION

According to the present invention, there is provided an improved bale discharge arrangement.

An object of the invention is to provide a bale discharge arrangement including a device for sensing when a bale discharge ramp or pushbar is in a home position. This object is accomplished by using a pressure sensing valve that detects when a hydraulically powered ramp or pushbar is in the home position by the rapid increase in system pressure caused as the ramp or pushbar cylinder hits the end of its stroke. At this point, the pressure sensing valve operates to permit the discharge gate to close without contacting the discharged or ejected bale.

This and other objects of the invention will become apparent from a reading of the ensuing description together with the appended drawings.

DESCRIPTION OF THE PREFERRED EMBODIMENT

Figure 1:
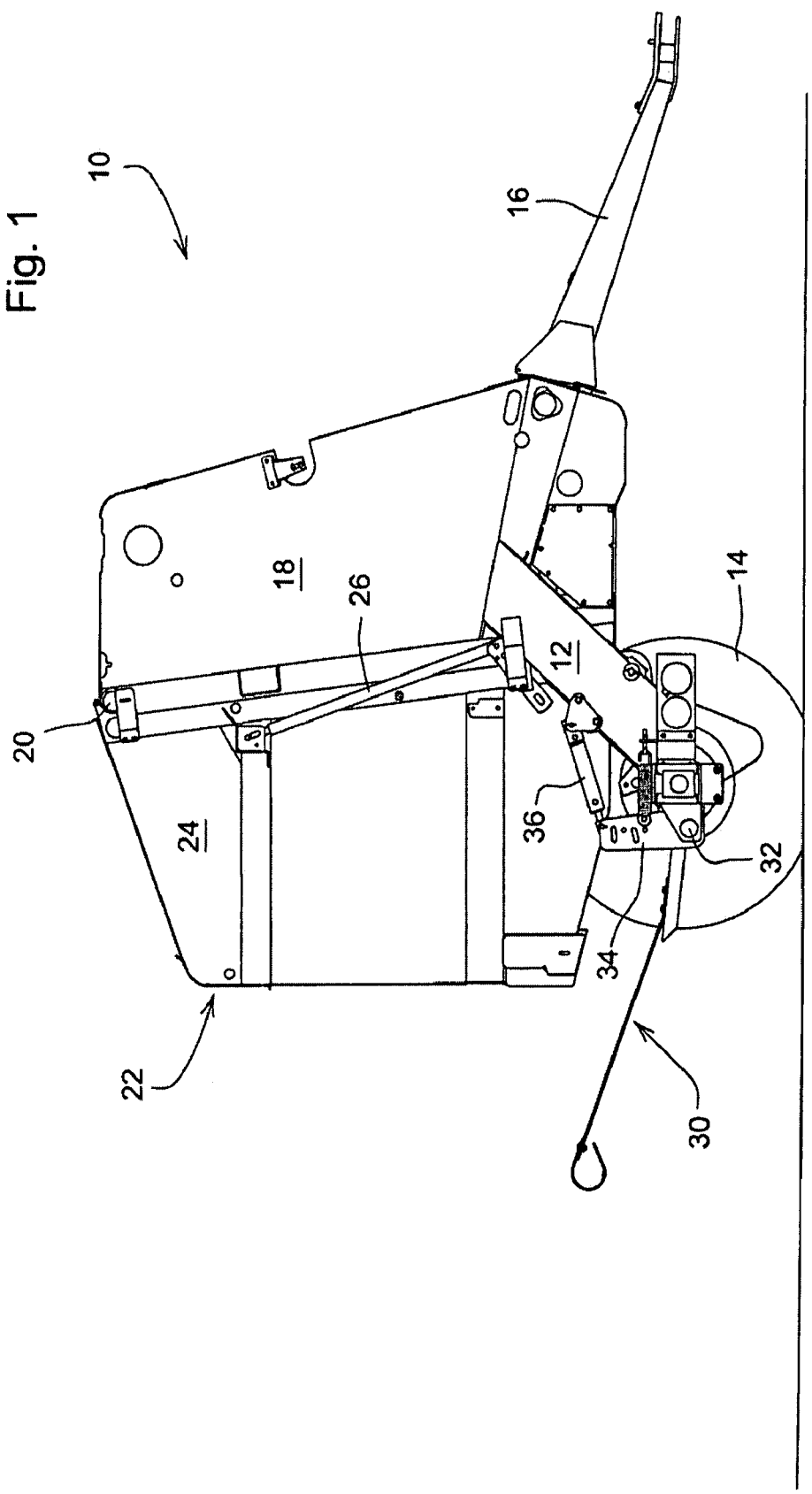
FIG. 1 is a right side view of a large round baler shown with its discharge gate closed and ejection ramp in a raised, home position.
Figure 2:
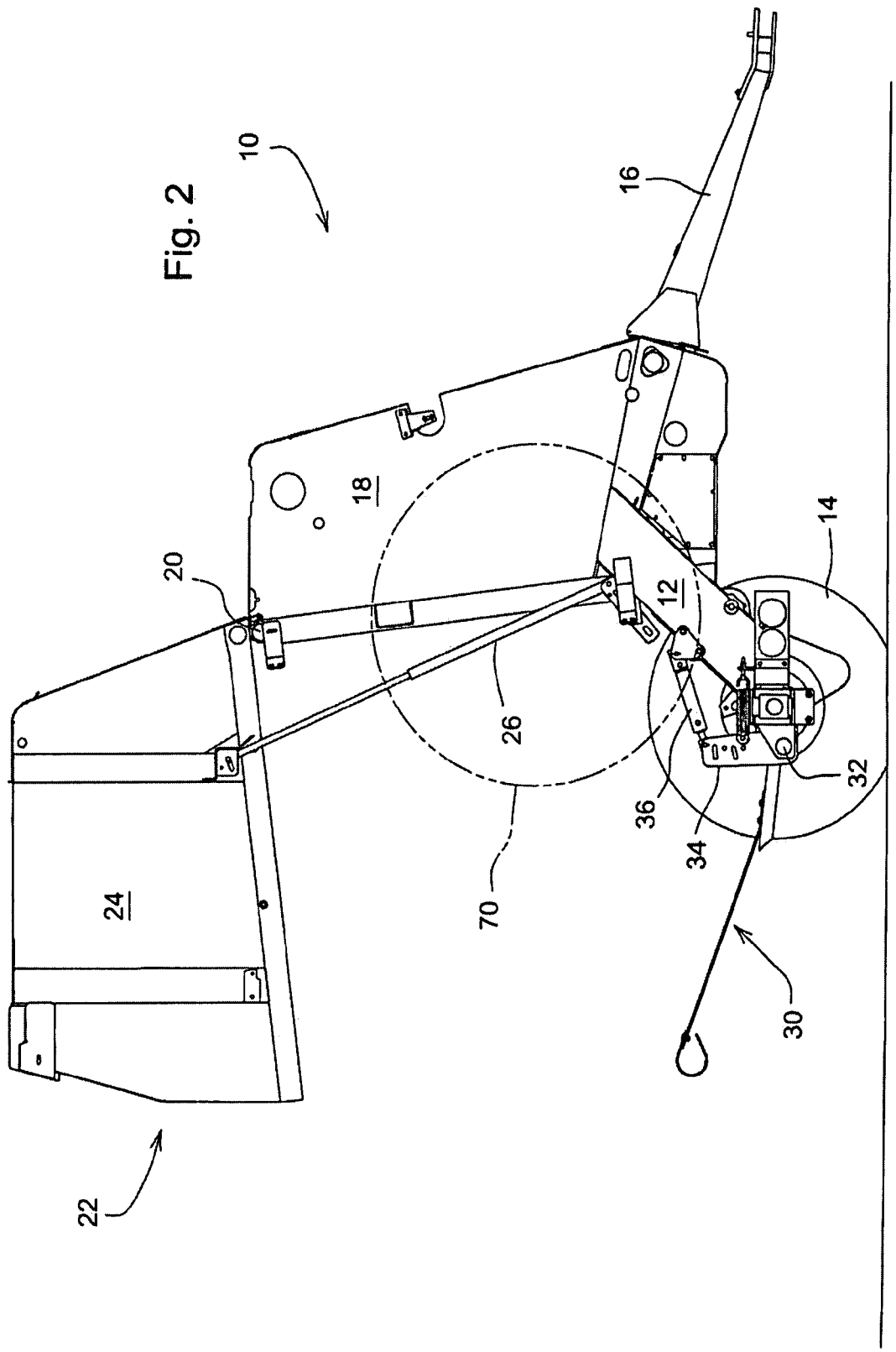
FIG. 2 is a right side view of the baler of FIG. 1, but with the discharge gate being shown in a raised, discharge position, and with the ejection ramp being shown in its raised, home position, just prior to receiving a bale being discharged.

Referring now to FIGS. 1-4 of the drawings, there is shown a schematic representation of a large round baler including a main frame 12 supported on a pair of ground wheels 14. A draft tongue 16 has a rear end joined to the frame 12 and has a forward end defined by a clevis arrangement adapted for being coupled to a towing vehicle (not shown). A pair of upright side walls 18 are fixed to the main frame 12 and define forward regions of opposite side walls of a baling chamber. Mounted for pivoting vertically about a horizontal pivot arrangement 20 located at an upper rear location of the side walls 18 is a discharge gate 22 including opposite upright side walls 24, which define opposite sides of a rear region of the baling chamber. A gate cylinder arrangement here disclosed as comprising a pair of double-acting gate cylinders 26 and 28 (see FIG. 5) are coupled between the main frame 12 and the opposite side walls 24 of the discharge gate 22 and are selectively operable for moving the discharge gate 22 between a lowered baling position, as shown in FIG. 1, and a raised discharge position, as shown in FIG. 2.

Figure 3:
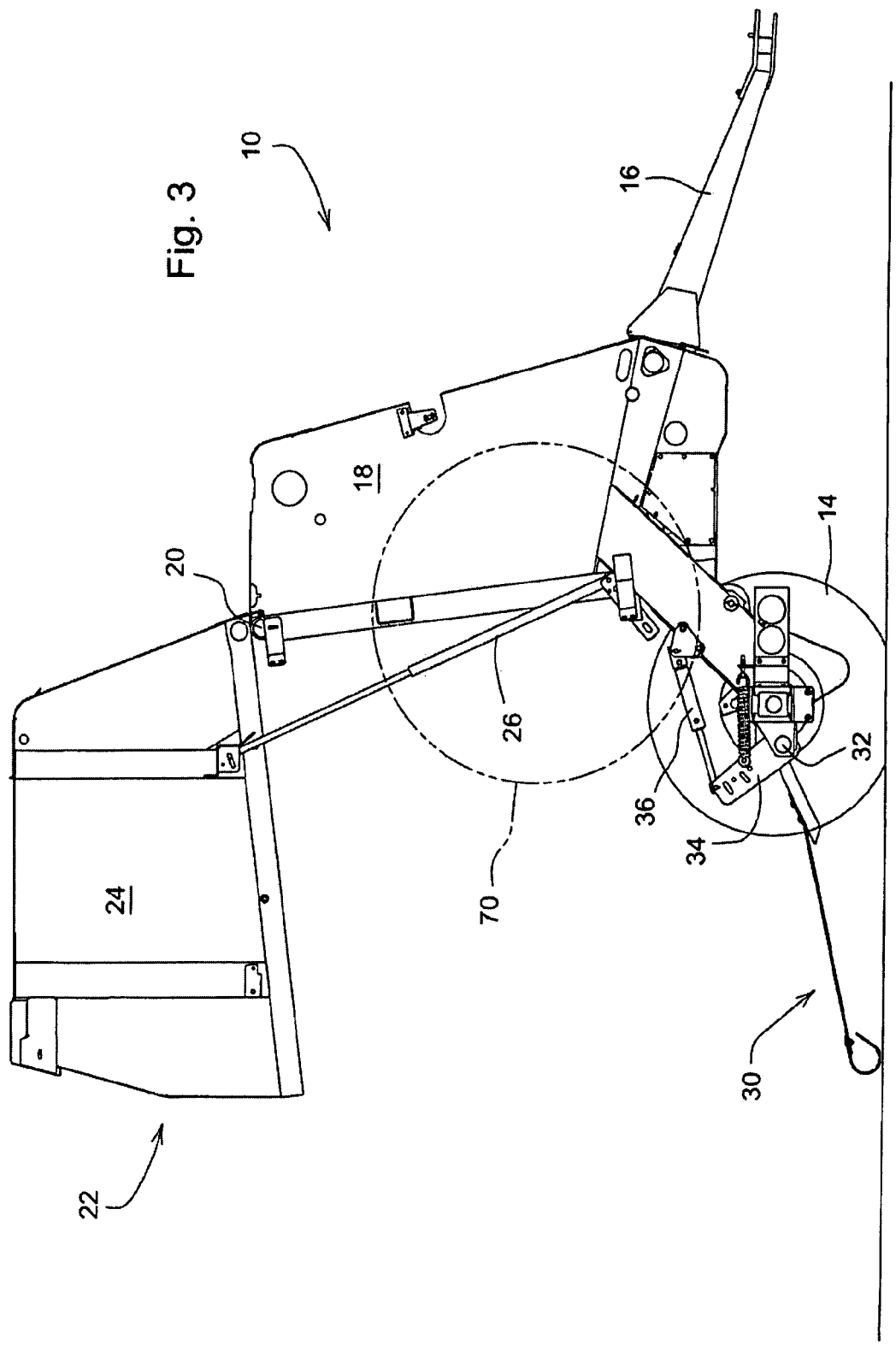
FIG. 3 is a right side view like that of FIG. 2, but with the ramp being shown in a downwardly tilted, ejection position.
Figure 4:
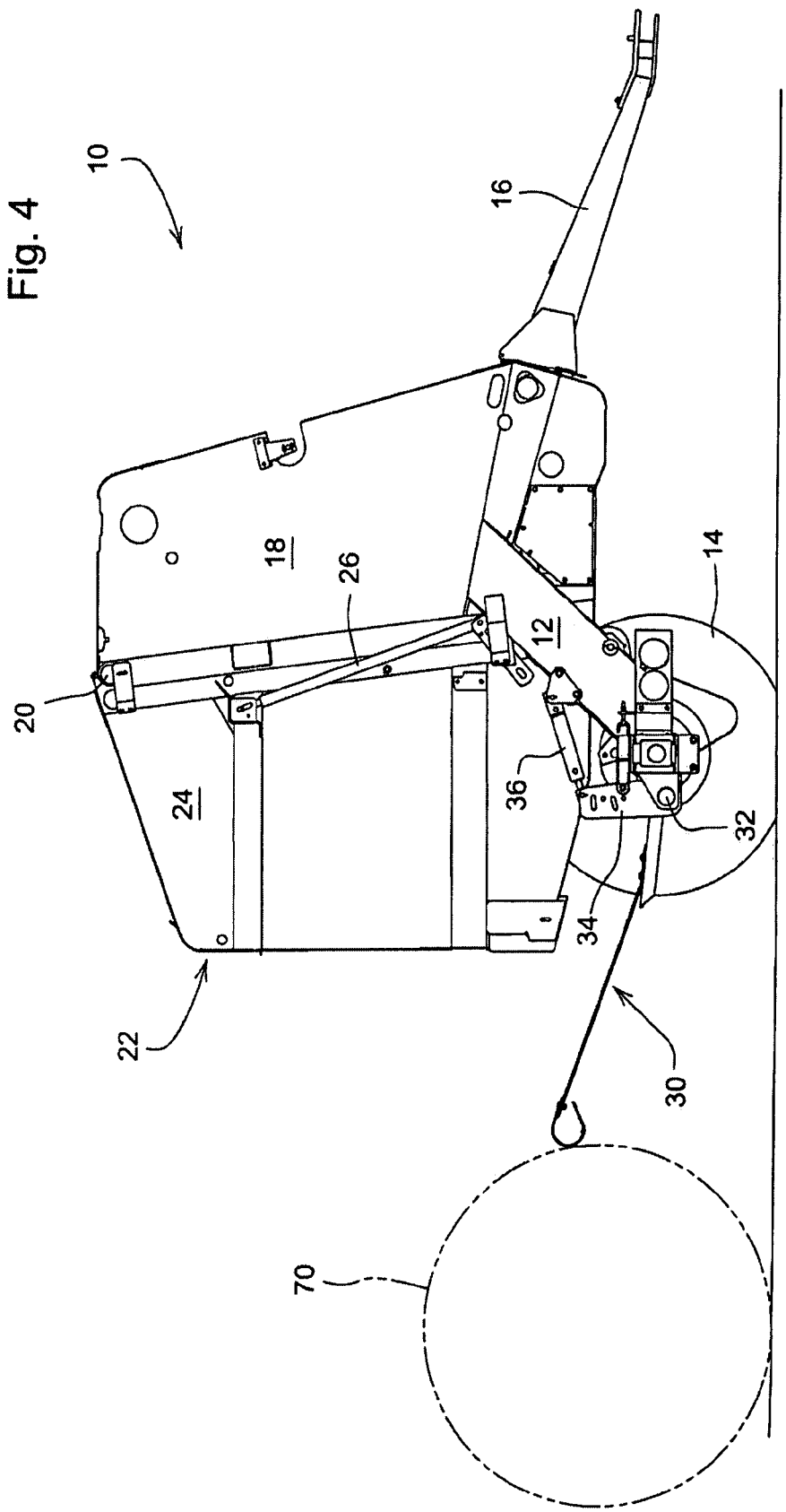
FIG. 4 is a view like that of FIG. 1, but showing a bale held away from the baler discharge gate by the ejection ramp, which is shown in its raised, home position.

A bale ejection ramp 30 is mounted to a lower rear location of the main frame 12 for pivoting vertically about a horizontal transverse pivot assembly 32 between a raised, home or standby position, as shown in FIG. 1, and a lowered ejection position, as shown in FIG. 3. An upright arm 34 is located at a front region of the ramp 30, and coupled between the arm 34 and the main frame 12 is a ramp cylinder arrangement here shown as comprising a double-acting, hydraulic bale ramp cylinder 36 which operates to swing the ramp 30 between the raised standby position and the lowered ejection position.

Figure 5:
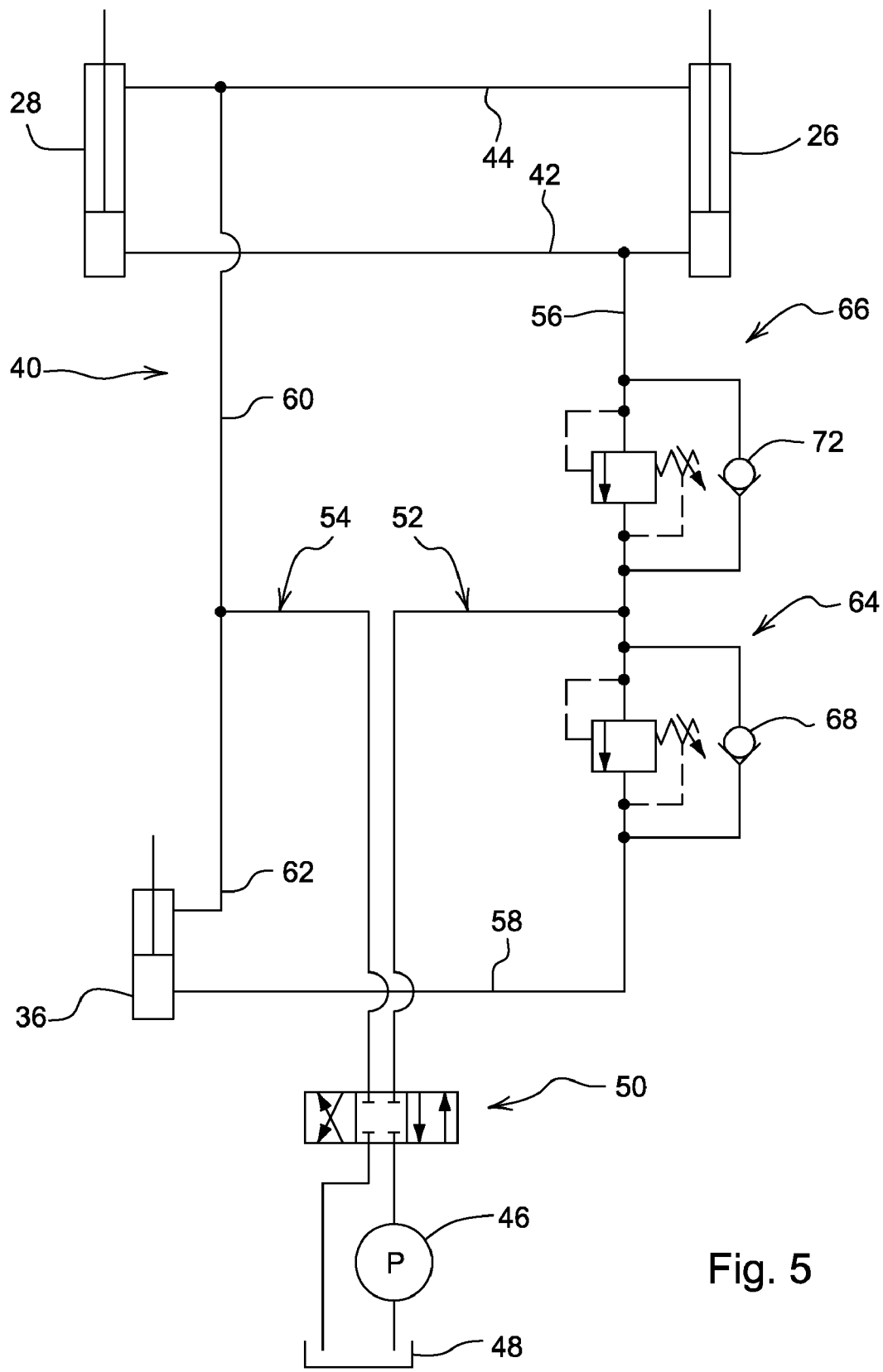
FIG. 5 is a view showing a schematic of the hydraulic system of the baler pertaining to the operation of the discharge gate and ejection ramp cylinders.

Referring now to FIG. 5, there is shown a schematic hydraulic circuit 40 for controlling operation of the pair of gate cylinders 26 and 28 and the ramp cylinder 36. The pair of gate cylinders 26 and 28 are coupled in parallel with each other by a head end line 42 joining respective first chambers at the head ends of the cylinders 26 and 28, and by a rod end line 44 joining respective chambers at the rod ends of the cylinders 26 and 28.

A source of fluid pressure, here shown as a pump 46, and a fluid reservoir or sump 48 are respectively coupled to pressure and return ports of a selective control valve 50, with the pump and reservoir or sump and control valve all normally being located on the towing vehicle, such as an agricultural tractor, for example. The control valve 50 has respective ports coupled to first and second pressure/return lines 52 and 54, respectively. The first pressure/return line 52 includes a first branch line 56 connected to the head end chambers of the gate cylinders 26 by way of the head end line 42, and a second branch line 58 coupled to a chamber at the head end of the ramp cylinder 36. The second pressure/return line 54 has a first branch line 60 coupled to the rod end chambers of the gate cylinders 26 and 28 by way of the rod end line 44, and a second branch line 62 coupled to the rod end chamber of the ramp cylinder 36. The control valve 50 is here shown as a three-position, two-way valve, and is moveable among a neutral position, as shown, wherein fluid flow is blocked from occurring to and from the gate and ramp cylinders, with the control valve 50 being shiftable leftward into an extend position for effecting extension of the gate and ramp cylinders, and shiftable rightward into a retract position for effecting retraction of the gate and ramp cylinders.

A timing and sequence control arrangement is provided for controlling the timing and sequence of operation of the gate and ramp cylinders and includes a pressure sensing arrangement comprising a first pressure relief valve 64 for controlling pressure fluid flow to the head end of the ramp cylinder 36, and a second pressure relief valve 66 for controlling return fluid flow from the head ends of the gate cylinders 26 and 28.

Specifically, the first pressure relief valve 64 has a first relief or cracking pressure setting and is located in the branch line 58 for preventing the flow of pressure fluid to the head end chamber of the ramp cylinder 36, when the control valve 50 is in its extend position, until a pressure equal to the first relief pressure setting is present in the pressure/return line 52 upstream of the pressure relief valve 64. A pressure equal to the first relief pressure setting does not occur until the gate cylinders 26 and 28 have become extended so as to place the gate 22 in its discharge position. It is noted that the first pressure relief valve 64 incorporates a bypass line containing a check ball 68 through which a return fluid path is established in the direction of the control valve 50 when the control valve 50 is in its leftward, retract position.

The second pressure relief valve 66 has a second relief or cracking pressure setting and is located in the branch line 56 of the pressure/return line 52 for preventing the flow of return fluid from the head end chambers of the gate cylinders 26 and 28, when the control valve 50 is in its leftward, retract position, so as to prevent retraction of the gate cylinders until the pressure in the branch line 56, upstream of the second relief valve 66 attains a value equal to the second pressure relief setting, this value not being attained until the ramp cylinder 36 has become retracted so as to place the ramp 30 in its home position, with the pressure then spiking in the rod end chambers of the gate cylinders 26 and 28 so as to so as to act through the cylinder pistons and cause an increase in the pressure in the head end chambers of the gate cylinders. The second relief valve 66 incorporates a bypass line containing a check ball 72 for permitting free flow of pressure fluid to the head end chambers of the gate cylinders when the control valve 50 is in its leftward, extend position.

It is noted that, as viewed in FIG. 5, when the control valve 50 is placed in its leftward, extend position and the gate cylinders 26 and 28 have become fully extended so as to place the gate 22 in its discharge position, the pressure in the first branch 56 of the pressure/return line 52 will rise in the region between the second relief valve 66 and the gate cylinders 26 and 28 and cause the relief valve 66 to open upon the pressure reaching the cracking pressure of the second relief valve 66. Once the second relief valve 66 opens, the pressure will be sensed by the first relief valve 64 which opens, when its cracking pressure is reached, so as to permit extension of the ramp cylinder 36 so as to place the ramp 30 in its ejection position.

Further, it is to be noted that relief valves, such as the relief valves 64 and 66, have an advantage over traditional sequence valves since the sequence valves need a zero pressure reference, which is difficult to execute on an agricultural implement having cylinders which are coupled to conduits which alternate between couplings with a pressure source and with a reservoir.

Also, it is to be noted that while typical relief valves are designed with a holding pressure of about 90% of their cracking pressure, the relief valves 64 and 66 are significantly different in that they are designed to have holding pressures that are about 20% of their cracking pressures. This has the advantage that there is a significant increase in the available pressure to actuate downstream functions (in this case the ramp cylinder 36). The cracking pressure setting of each of the pressure relief valves 64 and 66 is variable, with the cracking pressure of the second relief valve 66 being preferably set below the cracking pressure of the first relief valve 64 so as to ensure that the ramp cylinder 36 will follow operation of the gate cylinders 26 and 28, when being extended, and will lead operation of the gate cylinders when being retracted.

In operation, assuming that it is desired to discharge a completed bale 70 from the baling chamber of the baler 10, the control valve 50 is shifted leftward from its neutral position to the extend position wherein the pump 50 is initially coupled only to the head end chamber of each of the gate cylinders 26 and 28, while the reservoir 52 is coupled to the rod ends of each of the gate cylinders and the ramp cylinder 36. Pressure fluid will then flow through the bypass line, via the check ball 72, of the second relief valve 66. The gate cylinders 26 and 28 will then extend so as to swing the discharge gate 22 to its raised, discharge position, as shown in FIG. 2. Once the discharge gate 22 is completely raised, the pressure in the head end chambers of the gate cylinders 26 and 28 will increase to a value equal to the cracking pressure of the second relief valve 66 so as to cause the valve 66 to open. Pressure in the pressure/return line 52 will increase upstream of the first pressure relief valve 64 until the pressure reaches a value equal to the cracking pressure setting of the first pressure relief valve 64, whereupon the relief valve 64 will open permitting pressure fluid to flow to the head end chamber of bale ramp cylinder 36. The ramp cylinder 36 will then extend so as to move the ramp 30 to its lowered, ejection position permitting the bale 70 to roll down the ramp 30.

Once the bale 70 has been ejected, the control valve 50 is shifted rightward to its retract position wherein the pump 50 is coupled to the pressure/return line 54, with pressure fluid flowing through the branch line 60 to the rod ends of each of the gate cylinders 26 and 28, and with pressure fluid flowing through the branch line 62 to the rod end of the ramp cylinder 36. At this time, the pressure in the branch line 56 of the pressure/return line 52 at a point upstream of the second pressure relief valve 66 will be relatively low, with the relief valve 66 being closed and blocking return fluid flow from the head ends of the gate cylinders 26 and 28, which prevents retraction of the cylinders 26 and 28. At the same time, pressure fluid will be entering the rod end of the ramp cylinder 36 by way of the branch line 62 and cause the cylinder 36 to retract to place the ramp 30 back in its raised home position. Once the cylinder 36 is so retracted, the pressure in the rod ends of the cylinders 26, 28, and 36 will increase until the pressure in the rod end chambers of the gate cylinders 26 and 28 acts upon the pistons of these cylinders so as to generate a pressure in the head end chambers of the cylinders which is equal to the cracking pressure of the second pressure relief valve 66. The relief valve 66 will then open permitting return flow from the head ends of the gate cylinders 26 and 28 permitting the cylinders 26 and 28 to retract and move the discharge gate 22 to its closed baling position.

It will be appreciated then that the relief valves 64 and 66, as embodied in the hydraulic circuit 40, result in a simple hydraulic system which operates from completely internal hydraulic pressure sensing, thus avoiding mechanical reliability issues. Further, the timing and sequencing of the operation of the discharge gate 22 and the ramp 30 is adjustable by relief pressure adjustments present in the relief valves 64 and 66. Furthermore, it is apparent that the hydraulic system can easily be integrated into a compact hydraulic block with other hydraulic cartridge components, resulting in a profound cost advantage when compared to prior art systems.

Having described the preferred embodiment, it will become apparent that various modifications can be made without departing from the scope of the invention as defined in the accompanying claims.

The invention claimed is:

1. In a large round baler including a discharge gate mounted for pivoting vertically between a lowered baling position and a raised discharge position, a pair of extensible and retractable gate cylinders coupled to said gate for selectively swinging the gate between said baling and discharge positions, a bale ejection ramp mounted at a location beneath said discharge gate for pivotal movement between a raised home position and a lowered ejection position, an extensible and retractable ramp cylinder coupled to said ramp for selectively moving said ramp between said home and ejection positions, and a hydraulic circuit including a control valve selectively shiftable among a neutral position, wherein the flow of fluid to and from the gate and ramp cylinders is blocked, a first operating position wherein pressure fluid is routed to first chambers of each of said gate and ramp cylinders for causing said gate cylinders and ramp cylinder to be shifted in respective first directions for effecting movement of said gate toward said discharge position and said ramp to said ejection position, and a second operating position wherein pressure fluid is routed to second chambers of each of said gate and ramp cylinders for causing said gate cylinders and ramp cylinder to be shifted in respective second directions for effecting movement of said gate toward said baling position and said ramp toward said home position, the improvement comprising: said hydraulic circuit including first and second pressure/return lines each coupled to said control valve, with said first pressure/return line including a first branch coupled to said first chamber of said ramp cylinder and containing a first pressure relief valve having a first cracking pressure setting, and including a second branch coupled to said first chambers of each of said gate cylinders and containing a second pressure relief valve having a second cracking pressure setting; said second relief valve being arranged to permit free flow of pressure fluid to said gate cylinders when said control valve is in said first operating position, while said first pressure relief valve is arranged for permitting flow to said ramp cylinder only after said first relief valve has opened which occurs only after the gate cylinders have moved the gate to its discharge position and the pressure in said first branch equals said first cracking pressure so as to cause said first relief valve to open; and said second pressure relief valve being arranged for preventing return flow from said first chambers of said gate cylinders, when said control valve is in said second operating position, until said ramp cylinder has moved said ramp to said home position and the pressure in second chambers of said gate cylinders has risen sufficiently to cause the pressure in said second chambers of said gate cylinders to equal said second cracking pressure so as to cause said second relief valve to open permitting said gate cylinders to move said gate to its baling position.

2. The large round baler, as defined in claim 1, wherein said first and second relief valves are constructed such that their relief pressure settings are variable, thereby making it possible to adjust the timing and sequencing of the operation of the ejection ramp relative to the operation of the discharge gate.

3. The large round baler, as defined in claim 1, wherein said first and second relief valves are constructed such that their cracking pressures are substantially higher than their holding pressures, thereby making pressure available for downstream functions.

4. The large round baler, as defined in claim 3, wherein the holding pressure of each of the first and second relief valves equals approximately 20% of the cracking pressure.

5. In a large round baler including a discharge gate mounted for pivoting vertically between a lowered baling position and a raised discharge position, an extensible and retractable hydraulic gate cylinder arrangement coupled to said discharge gate for swinging said discharge gate between said baling and discharge positions, a bale ejection ramp mounted for pivoting between a raised home position and a lowered ejection position, an extensible and retractable hydraulic ramp cylinder arrangement coupled to said bale ejection ramp for moving it between said home and ejection positions, and a hydraulic system including a source of pressure fluid and a reservoir coupled to a control valve, which control valve is in turn coupled to said gate cylinder arrangement and said ramp cylinder arrangement, the improvement comprising: said hydraulic system further including a relief valve assembly coupled to said control valve and said gate and ramp cylinder arrangements in such a way that the flow of pressure fluid from said control valve for actuating said ramp cylinder arrangement for moving said ramp from said home position to said ejection position is blocked until after said gate cylinder arrangement has been actuated to move said discharge gate to said discharge position; and said relief valve assembly further being operative for preventing the flow of return fluid from said gate cylinder arrangement, when the control valve is operated for actuating said gate cylinder arrangement for returning said discharge gate to its baling position, until after said ramp cylinder arrangement has returned said ramp to its home position.

6. The large round baler, as defined in claim 5, wherein said gate cylinder arrangement includes a pair of extensible and retractable gate cylinders, and wherein said ramp cylinder arrangement includes an extensible and retractable ramp cylinder.

7. The large round baler, as defined in claim 5, wherein said relief valve assembly includes first and second relief valves, with said first relief valve being connected in circuit between said control valve and said ramp cylinder arrangement and having a first cracking pressure, and with said second relief valve being connected in circuit between said control valve and said gate cylinder arrangement and having a second cracking pressure.

8. The large round baler, as defined in claim 7, wherein said relief valves have variable cracking pressure settings, thereby making it possible to adjust the operating timing and sequencing of the ejection ramp relative to that of the discharge gate.

9. The large round baler, as defined in claim 8, wherein the cracking pressure of each of said first and second relief valves is substantially higher than respective holding pressures of said first and second relief valves.

10. The large round baler, as defined in claim 9, wherein the holding pressure of each of said first and second relief valves is approximately 20% of the respective cracking pressure of each of said first and second relief valves.

* * * * *